Jan. 2, 1968

F. ALPER 3,361,160

FLOW CONTROL DEVICE

Filed June 16, 1965

INVENTOR.
FRANK ALPER
BY Seidel & Gonda
ATTORNEYS.

United States Patent Office 3,361,160
Patented Jan. 2, 1968

3,361,160
FLOW CONTROL DEVICE
Frank Alper, Cherry Hill Estates, N.J., assignor, by mesne assignments to The First National Bank of Stone Harbor, Stone Harbor, N.J.
Filed June 16, 1965, Ser. No. 464,342
6 Claims. (Cl. 137—557)

This invention relates to a flow control device, and more particularly, to a valve having a metered outlet passage.

The valve of the present invention may assume a wide variety of forms and shapes. For purposes of illustration, the valve is in the form of a manually operable needle valve. Thus, a valve body is provided with inlet passage means, and outlet passage means each communicating with a valving chamber. Within the valving chamber, there is provided a valve head which is selectively movable toward and away from a valve seat to control flow from the inlet passage means into the valving chamber. The inlet passage means is coupled to a pressure gauge so that the inlet pressure may be constantly monitored.

The valve of the present invention is particularly adapted for use with gas cylinders, such as a gas cylinder containing oxygen at 3,000 p.s.i. As the oxygen is being dispensed, or even when no gas is being dispensed, the operator may immediately ascertain the pressure of the gas in the cylinder. This advantage results from the location of the connection for the pressure gauge being on the inlet side of the valving chamber.

The outlet passage means from the valving chamber is preferably in the form of a nipple removably coupled to the valve body. A metering pin member is provided within the nipple. The pin member must cooperate with the nipple so as to provide a very accurate metering passage. In the preferred embodiment of the present invention, the metering passage is formed by making the pin member from a drawn tube. Thus, the metering passage may have a diameter of .003 inch and facilitate dispensing oxygen at the rate of six cubic liters per minute.

It is an object of the present invention to provide a novel flow control device.

It is another object of the present invention to provide a novel metering valve.

It is another object of the present invention to provide a valve having a metered outlet passage.

It is another object of the present invention to provide a valve having a metered outlet passage and a pressure gauge on opposite sides of a valving chamber whereby the pressure in a gas cylinder may be constantly monitored regardless of the open or closed disposition of the valve.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
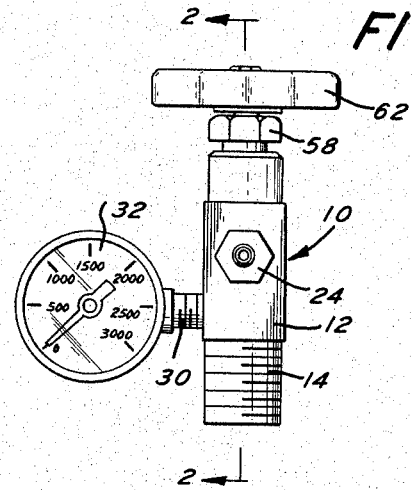
FIGURE 1 is a side elevation view of the present invention.

Referring to the drawing in detail, wherein like numerals indicate like elements, there is shown in FIGURE 1 a valve designated generally as 10. The valve 10 includes a valve body 12 having external threads 14 at one end thereof. The threads 14 are concentrically disposed about a longitudinally extending inlet passage 16. The threads 14 are adapted to connect the passage 16 to a cylinder or other source of fluid.

The inlet passage 16 extends from end 18 to a valve seat 20. Between the extremities of the inlet passage 16, there is provided a tapped bore 22 receiving a plug 24. A solid imperforate disk 26 rests on a shoulder of the tapped bore 22 and is held thereagainst by the plug 24.

A tapped bore 28 also extends partially through the valve body 12 in a direction perpendicular to the direction of tapped bore 22 and also perpendicular to the longitudinal axis of inlet passage 16. Bore 28 intersects inlet passage 16 and receives a threaded stem 30 on a pressure gauge 32.

The valving chamber 34 extends from the valve seat 20 to the end of the valve body 12 remote from end 18. The lowermost end of the valving chamber 34 is provided with internal threads which mate with external threads on a valve head support 36. Support 36 removably receives a valve head 38 having a metering needle 40. Needle 40 extends into the inlet passage 16 when the valve head 38 closes the flow passage into the valving chamber by cooperation with valve seat 20. The head 38 and integral needle 40 are preferably made from a flexible resilient material such as rubber, a synthetic polymeric resin, etc.

An actuator shaft 42 is provided for rotating the support 36 so as to cause the head 38 to move toward and away from the seat 20. The upper end of support 36 is provided with a rectangular slot which receives a correspondingly shaped tongue 44 on the lower end of shaft 42. The tongue 44 depends from a radially outwardly directed flange 48 at the terminal end of the shaft 42.

A gasket 46 of a flexible resilient material, such as those described above, is concentrically disposed around the shaft 42 above the flange 48. The valve body 12 is provided with a horizontally disposed shoulder 56 which receives a packing gland. The gland includes metallic disks 52 and 54 on opposite sids of a gasket 54. The gasket 54 is preferably made from one of the above-mentioned materials. A gland nut 58 surrounds the shaft 42 and is engaged with internal threads 60 at the upper end of valve body 12. By turning gland nut 58, the disks 50 and 52 will deform the gasket 54 causing its outer periphery to sealingly engage the inner periphery of the juxtaposed portion of the valve body 12. The deformation of the gasket 42 also provides a seal between its inner periphery and the outer periphery of the shaft 42. At the same time, the gasket 46 will be deformed so as to prevent fluid from escaping along the outer peripheral surface of the shaft 42.

In order to rotate the shaft 42, a handle 62 is provided. The handle 62 rests on a shoulder at the upper end of the shaft 42. A nut 64 is engaged with external threads on the upper end of the shaft 42 with the handle hub between it and the last-mentioned shoulder.

Fluid is permitted to communicate from the valving chamber 34 by way of an outlet passage means. The outlet passage means is within a nipple means 66. Nipple means 66 includes a body structure having a threaded stem 68 removably engaged with threads on the body 12. A wrench portion 72 is provided on the body structure of the nipple means 66. A gasket 70, preferably made from one of the materials referred to above, is disposed between the body 12 and the wrench portion 72. The body structure of the nipple means 66 is provided with a tube engaging set of ribs 74 which facilitate slipping a hose or tube over the nipple means.

The nipple means 66 has an outlet port 76 communicating with a bore 80 of larger cross section. Fixedly disposed within the bore 80 is provided a metering pin member 78. The metering pin member 78 is preferably welded to the body structure of the nipple means 66. Also, the pin member 78 at its lefthand end is against a shoullder formed by the difference in diameters of the bore 80 and outlet port 76. Hence, the pressure of the fluid being controlled cannot force the pin member 78 out through the nipple means 66.

In order to obtain a flow of 6 cubic meters per minute, I have ascertained that the metering passage must have a diameter of .003 inch. I have found it extremely difficult to manufacture pin members with this extremely small diameter bore with any degree of accuracy without rendering the cost of the same prohibitive. I have found that the most inexpensive and reliable way of controlling the diameter of the metering passage is to start with a tube having an inner diameter greater than that which I desire. Thereafter, the tube is drawn until the inner diameter corresponds with that desired. Thus, I prefer to make pin member 78 from stainless steel which has been drawn until the metering passage 79, constituting the inner diameter of the pin member, is .003 inch.

Figure 2:
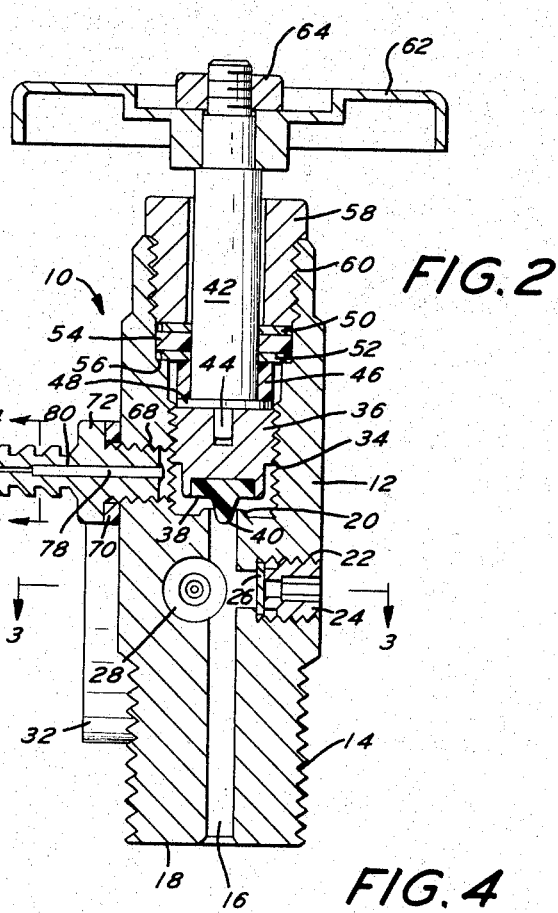
FIGURE 2 is a longitudinal sectional view taken along the line 2—2 in FIGURE 1.
Figure 3:
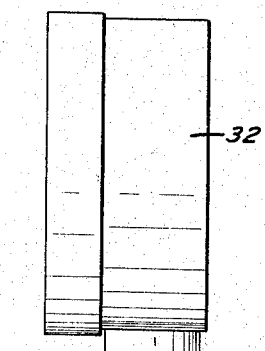
FIGURE 3 is a sectional view taken along the line 3—3 in FIGURE 2.
Figure 4:
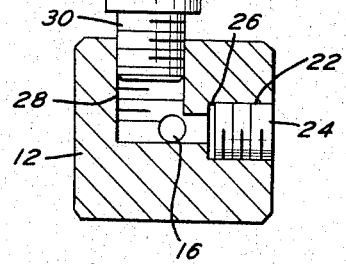
FIGURE 4 is a view taken along the line 4—4 in FIGURE 2.
Figure 5:
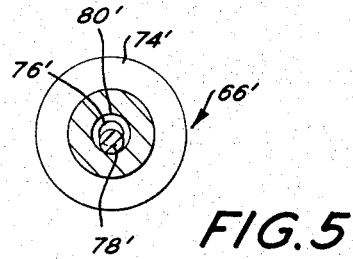
FIGURE 5 is a view similar to FIGURE 4 but illustrating the novel feature of another embodiment.

As shown more clearly in FIGURE 5, the nipple means 76' may have its metering passage constructed and arranged by using a solid pin member 78'. The pin member 78' also rests on a shoulder formed by the intersection of the bores 76' and 80'. The diameter of the pin member 78' is chosen so that the pin member 78' overlies and secures most of the bore 76' thereby leaving a metering passage which is accurately controlled. The embodiment in FIGURE 5 is not the preferred embodiment. The nipple means 66' is adapted to be utilized in conjunction with a valve as illustrated in FIGURE 2.

The valve body, the support 36, and the nipple means 66 including the pin member 78 are preferably made from stainless steel. The valve head and seat cooperation, its actuator, and the packing gland associated with the actuator, are merely exemplary.

The present invention may be embodied in other specific forms without departing from the spirit or essential attributes thereof and, accordingly, reference should be made to the appended claims, rather than to the foregoing specification as indicating the scope of the invention.

I claim:
1. A flow control device comprising a valve body, said body having an inlet passage communicating with a valving chamber within said body, a manually operable valve head means in said chamber for controlling flow from said inlet passage to said chamber, an outlet nipple means removably coupled to said body and containing an outlet passage having a diameter substantially smaller than the inlet passage and directly communicating with said chamber, and a metering pin member fixed in said nipple means substantially parallel with said outlet passage to restrict the amount of flow through the outlet passage.

2. A flow control valve comprising a valve body, an inlet passage communicating with a valving chamber within said body, a pressure gauge connected to said inlet passage, a manually operable movable valve head in said chamber for controlling flow from said inlet passage to said chamber, a single outlet nipple angled with respect to said inlet passage and removably coupled to said body, a metering pin member fixed within said nipple means, said pin member being hollow and defining an outlet passage communicating with said chamber.

4. A flow control valve comprising a valve body, an inlet passage communicating with a valving chamber within said body, a manually operable movable valve head within said chamber for controlling flow from said inlet passage to said chamber, an outlet nipple means removably coupled to said body and containing an outlet passage having a substantially smaller diameter than said inlet passage and directly communicating with said chamber, a solid metering pin fixed within said outlet passage, said outlet passage including two bores of different diameters, said pin member being in the bore of the greatest diameter and against a shoulder between said bores, the diameter of said pin member being smaller than the diameter of the larger bore forming a part of the outlet passage, the longitudinal axis of said pin member being offset with respect to the longitudinal axis of the smaller bore.

5. A flow control valve in accordance with claim 4 including a pressure gauge connected to said inlet passage.

6. A flow control valve comprising a valve body, said valve body having an inlet passage communicating with a valving chamber within said body, a movable valve head means in said chamber for controlling flow from said inlet passage to said chamber, manually operable means coupled to said valve head means for selectively moving said valve head means toward and away from a valve seat surrounding said inlet passage, a pressure gauge for indicating the pressure in the inlet passage, said gauge communicating with said inlet passage, threads on said valve body surrounding said inlet passage, a nipple coupled to said valve body and communicating directly with said chamber, said nipple having a hollow pin member fixedly disposed therein, said hollow pin member being in communication with said valving chamber and defining a metered outlet passage substantially smaller in transverse cross section than the inlet passage for fluid flow from said outlet chamber.

References Cited

UNITED STATES PATENTS

| | | | |
|---|---|---|---|
| 1,994,460 | 3/1935 | Bijur | 138—40 X |
| 2,533,907 | 12/1950 | Anderson | 138—44 |
| 2,810,541 | 10/1957 | Thomas | 251—118 |
| 3,028,877 | 4/1962 | Thieme | 137—557 X |

FOREIGN PATENTS 540,878  11/1941  Great Britain.

HENRY T. KLINKSIEK, *Primary Examiner.*